United States Patent [19]

Pollok

[11] 4,309,636
[45] Jan. 5, 1982

[54] INSULATION CAPS FOR STATOR WINDING HEAD CONNECTIONS OF AN ELECTRIC MACHINE

[75] Inventor: Hans-Jürgen Pollok, Berlin, Fed. Rep. of Germany

[73] Assignee: Siemens Aktiengesellschaft, Berlin and Munich, Fed. Rep. of Germany

[21] Appl. No.: 65,629

[22] Filed: Aug. 10, 1979

[30] Foreign Application Priority Data

Aug. 17, 1978 [DE] Fed. Rep. of Germany ....... 2836230

[51] Int. Cl.³ .............................................. H02K 3/46
[52] U.S. Cl. ................................ 310/260; 310/43; 310/45; 264/272.11
[58] Field of Search ............... 310/260, 271, 273, 208, 310/43, 45, 71, 270, 42; 174/76; 264/272; 425/117; 249/114, 115

[56] References Cited

U.S. PATENT DOCUMENTS

| 3,075,250 | 1/1963 | Strohm | 310/260 |
| 3,151,260 | 9/1964 | MacCracken | 310/45 |
| 3,648,091 | 3/1972 | Kostin | 310/260 |
| 3,988,625 | 10/1976 | Jager | 310/260 |
| 4,047,867 | 9/1977 | Zona | 310/260 |
| 4,151,434 | 4/1979 | Zona | 310/260 |

FOREIGN PATENT DOCUMENTS

| 1281015 | 10/1968 | Fed. Rep. of Germany | 310/260 |
| 1489751 | 6/1967 | France | 310/260 |

*Primary Examiner*—R. Skudy
*Attorney, Agent, or Firm*—Kenyon & Kenyon

[57] ABSTRACT

The head connections on the lower end face of the stator winding of an electric machine are covered by trough-shaped insulating caps which have openings in their bottoms through which casting resin can be poured in, at the same time that caps are filled at the other end face. Succeeding insulating caps are turned 180° relative to each other so that a long leakage path is obtained.

1 Claim, 4 Drawing Figures

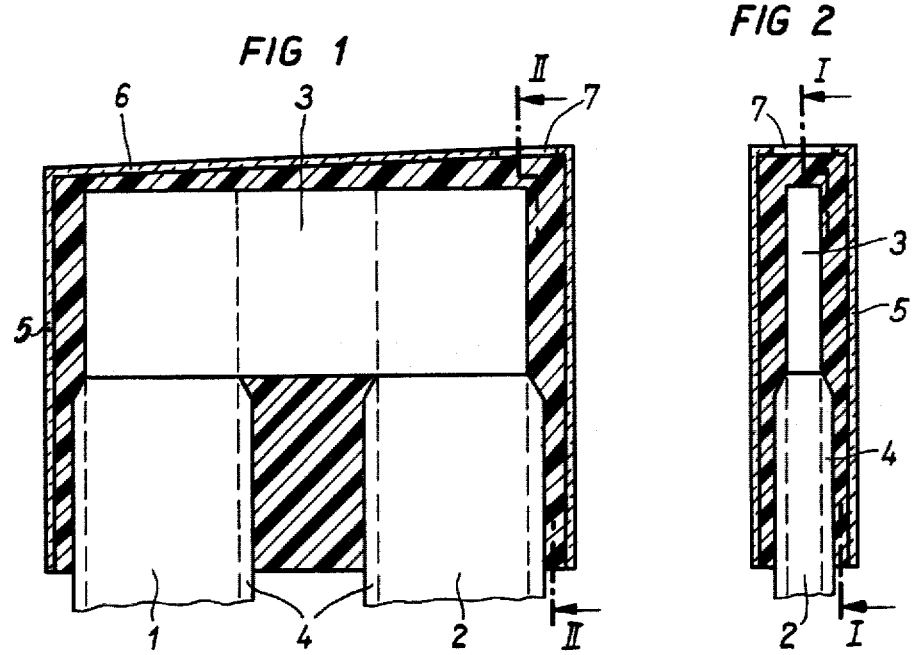

INSULATION CAPS FOR STATOR WINDING HEAD CONNECTIONS OF AN ELECTRIC MACHINE

BACKGROUND OF THE INVENTION

1. Field of the Invention

This invention relates to insulating caps for covering the soldered head connections of the stator winding of an electric machine. More particularly, the invention relates to insulation caps, the flat bottoms of which are placed adjacent to the head connections, the caps being then poured full of settable casting resin which extends over the conductor insulation and is subsequently hardened.

2. Description of the Prior Art

An electric machine having insulating caps in the shape of troughs is described in German Auslegeschrift No. 12 81 015. When the head connections between the winding bars of the stator winding are being soldered and the insulation caps of this machine are being attached, the machine is positioned so that the bar ends on one head side point vertically downward. A trough-shaped insulating cap, when placed thereon, is therefore horizontal and its bottom points downward. When soldering of the head connections has been completed, the insulating cap is then poured full with a settable casting resin from the open side. The casting resin then extends over the insulation of the winding conductors. Thereby, a gapless insulation is obtained, which merges with the conductor bar insulation after hardening. However, this method can be carried out only at one end face of the machine at a time. The machine must then be turned over so that the bar ends at the other end face also point downward. However, this can be done only after the casting resin in the insulating caps has hardened.

SUMMARY OF THE INVENTION

It is an object of the present invention to simplify the preparation of the insulation of the head connections in an electric machine of type described at the outset. According to the invention, this problem is solved by providing each insulating cap, at one end face of the machine, with a lateral filling opening in the bottom of the cap. The insulating caps along the circumference are each turned 180° relative to each other, in succession. Since the open side of each insulating trough can be sealed against the outflow out of casting resin in a manner known, for instance from U.S. Pat. No. 4,047,867, the insulating caps on the end face of the machine, which has bar ends pointing upward, can be poured full of the hardenable casting resin through filling openings arranged in the bottom of each trough-shaped insulating cap, at the same time as the insulating cap on the other end face of the machine.

This is of particular advantage when the stator winding is put in place at the construction site, as is customary, in particular, for hydraulic generators having vertical shafts, since, in this case, inverting over the stator of the machine would be impossible. The time required for making the insulation is also shortened since now the filled-in casting resin can harden at both end faces of the machine simultaneously. In spite of the filling opening provided in the bottom of the cap near one end face, however, there is no danger of breakdown due to voids in the casting resin. This is because the rotation of successive insulating caps, together with an air gap between the conductors, results in a sufficiently long surface leakage path through the filling opening. The distance between the head connections and the bottom of the insulating caps need not, therefore, be increased over and above that at the other end face.

BRIEF DESCRIPTION OF THE DRAWINGS

FIGS. 1 and 2 are, respectively, side and end views, in cross-section, taken through a head connection between two bars of the stator winding the sections being taken along the sector lines shown in the two figures; and FIGS. 3 and 4 are, respectively, top and bottom views of the insulating caps, as arranged successively along the circumference of the machine.

DETAILED DESCRIPTION OF THE INVENTION

In the stator winding of an electric machine, two winding bars 1 and 2 are usually soldered together at each end face by means of a head connection 3. The conductor insulation 4 on winding bars 1 and 2, ends immediately ahead of, and next to, head connection 3. To insulate a head connection 3, the machine is oriented so that the bar ends point vertically upward, as shown, at one end face. This is the case when, for instance, the stator winding of a hydraulic generator having a vertical shaft is to be put in place at the construction site. A trough-shaped insulating cap 5, for instance, of fiberglass-reinforced epoxy or polyester resin, is pushed over head connection 3 on the upward facing end face, so that the bottom 6 of the cap is adjacent to head connection 3. A laterally placed filling opening 7 is provided in bottom 6 near one end wall and a settable casting resin, for instance, epoxy resin with or without fillers such as quartz meal, is poured in in such a way that the entire interior of insulating cap 5 is filled beyond the ends of conductor insulation 4. The casting resin is prevented from flowing out of the lower, open end of insulating cap 5 by closing it off by suitable means, such as an elastic cushion, during the pouring and hardening.

Insulating caps 5 are disposed along the circumference of the machine, always rotated 180° relative to each other, as is shown in FIGS. 3 and 4, so that filling openings 7 of adjacent insulating caps 5 are always located on opposite sides. Thereby, a great lengthening of the surface leakage path, together with an air gap, is provided between the conductors so that a breakdown is not likely even if voids might be present in the casting resin.

What is claimed is:

1. A stator winding for an electric machine having a stator with insulated conductors soldered together at a plurality of adjacent and parallel head connections on both end faces of the machine, each head connection being covered by a trough-shaped insulating cap having a bottom placed adjacent to the associated head connection, side walls, and end walls, the side walls and the end walls overlapping the conductor insulation, the cap being filled with a casting resin hardened in place, the improvement comprising:

the bottom of each insulating cap at one end face of the stator having a laterally placed filling hole located near one end wall, and juxtaposed insulating caps at said one end face oriented so that the filling hole in one cap bottom is positioned 180° away from the filling holes in the bottom of the next adjacent insulating caps.

* * * * *